(12) United States Patent
Zhang

(10) Patent No.: US 10,834,245 B2
(45) Date of Patent: *Nov. 10, 2020

(54) RECEIVER AND CAMERA ASSEMBLY

(71) Applicant: GUANGDONG OPPO MOBILE TELECOMMUNICATIONS CORP., LTD., Guangdong (CN)

(72) Inventor: Haiping Zhang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/373,613

(22) Filed: Apr. 2, 2019

(65) Prior Publication Data

US 2019/0230204 A1  Jul. 25, 2019

Related U.S. Application Data

(63) Continuation of application No. 15/867,256, filed on Jan. 10, 2018, now Pat. No. 10,291,756.

(30) Foreign Application Priority Data

Mar. 7, 2017 (CN) .......................... 2017 1 0132219

(51) Int. Cl.
*H04M 1/02* (2006.01)
*H04M 1/03* (2006.01)
(Continued)

(52) U.S. Cl.
CPC ....... *H04M 1/0266* (2013.01); *H04M 1/0264* (2013.01); *H04M 1/03* (2013.01);
(Continued)

(58) Field of Classification Search
CPC .... H04M 1/0266; H04M 1/0264; H04M 1/03; H04N 5/2257; H04R 9/06
See application file for complete search history.

(56) References Cited

U.S. PATENT DOCUMENTS 10,291,756 B2 * 5/2019 Zhang ................ H04M 1/0264
2005/0128332 A1  6/2005 Tsuboi
(Continued)

FOREIGN PATENT DOCUMENTS

CN         1914900 A    2/2007
CN       101652980 A    2/2010
(Continued)

OTHER PUBLICATIONS

Chinese Patent Application No. 201710132219.0 Office Action dated Jun. 24, 2019, 7 pages.
(Continued)

*Primary Examiner* — Nguyen T Vo
(74) *Attorney, Agent, or Firm* — Lathrop GPM LLP

(57) ABSTRACT

The present disclosure provides a receiver and camera assembly configured to be mounted in a mobile terminal, comprising a receiver, a camera, and a sensor assembly, the receiver having a light signal passage, the camera being aligned with the light signal passage, the camera comprising a base and a camera lens, the base having a mounting surface facing the light signal passage, and the camera lens and the sensor assembly being mounted to the mounting surface.

7 Claims, 7 Drawing Sheets

(51) Int. Cl.
*H04N 5/225* (2006.01)
*H04R 9/06* (2006.01)
*G02B 5/00* (2006.01)

(52) U.S. Cl.
CPC ............. *H04N 5/2257* (2013.01); *H04R 9/06* (2013.01); *G02B 5/005* (2013.01); *H04R 2499/11* (2013.01)

(56) References Cited

U.S. PATENT DOCUMENTS

| | | | |
|---|---|---|---|
| 2007/0045550 | A1 | 3/2007 | Nakajo et al. |
| 2007/0248355 | A1 | 10/2007 | Lee |
| 2009/0298549 | A1 | 12/2009 | Lai |
| 2010/0165182 | A1* | 7/2010 | Yuan ................ G02B 5/005 348/374 |
| 2010/0315570 | A1 | 12/2010 | Mathew et al. |
| 2010/0331058 | A1 | 12/2010 | Qingshan et al. |
| 2013/0094126 | A1 | 4/2013 | Rappoport et al. |
| 2015/0062337 | A1 | 3/2015 | Scalisi |
| 2015/0077655 | A1* | 3/2015 | Choe ................ G02F 1/13452 349/12 |
| 2016/0277555 | A1 | 9/2016 | Lee et al. |
| 2017/0134547 | A1* | 5/2017 | Zeng ................ H04B 1/3833 |

FOREIGN PATENT DOCUMENTS

| | | |
|---|---|---|
| CN | 103841222 A | 6/2014 |
| CN | 203666511 U | 6/2014 |
| CN | 204119279 U | 1/2015 |
| CN | 104539833 A | 4/2015 |
| CN | 104601763 A | 5/2015 |
| CN | 204334759 U | 5/2015 |
| CN | 104793695 A | 7/2015 |
| CN | 104950419 A | 9/2015 |
| CN | 105791651 A | 7/2016 |
| CN | 205610701 U | 9/2016 |
| CN | 205647713 U | 10/2016 |
| CN | 205726042 U | 11/2016 |
| CN | 106331235 A | 1/2017 |
| CN | 106371187 A | 2/2017 |
| CN | 106453724 A | 2/2017 |
| CN | 106453725 a | 2/2017 |
| CN | 106453726 A | 2/2017 |
| CN | 106657485 A | 5/2017 |
| JP | 2007514368 A | 5/2007 |
| JP | 2013239788 A | 11/2013 |
| JP | 2014183396 A | 9/2014 |
| KR | 20090125547 A | 12/2009 |
| KR | 20110132901 A | 12/2011 |

OTHER PUBLICATIONS

Chinese Patent Application No. 201710132219.0 English translation of Office Action dated Jun. 24, 2019, 9 pages.
Chinese Patent Application No. 201710132219.0 English translation of Office Action dated Feb. 12, 2019, 8 pages.
Chinese Patent Application No. 201710132219.0 Office Action dated Feb. 12, 2019, 8 pages.
Chinese Patent Application No. 201710132220.3 Office Action dated Nov. 19, 2018, 8 pages.
Chinese Patent Application No. 201710132220.3 English translation of Office Action dated Nov. 19, 2018, 7 pages.
Chinese Patent Application No. 201710132220.3 Office Action dated May 10, 2019, 8 pages.
Chinese Patent Application No. 201710132220.3 English translation of Office Action dated May 10, 2019, 10 pages.
Chinese Patent Application No. 201710132220.3 Office Action dated Sep. 20, 2019, 9 pages.
Chinese Patent Application No. 201710132220.3 English translation of Office Action dated Sep. 20, 2019, 11 pages.
Chinese Patent Application No. 201710132220.3 Notification of Registration Action dated Mar. 13, 2020, 4 pages.
Chinese Patent Application No. 201710132220.3 English translation of Notification of Registration Action dated Mar. 13, 2020, 5 pages.
European Patent Application No. 18763659.2 extended Search and Opinion dated Oct. 25, 2019, 7 pages.
PCT/CN2018/074495 International Search Report dated Apr. 19, 2018, 10 pages.
PCT/CN2018/074495 English translation of International Search Report dated Apr. 19, 2018, 3 pages.
PCT/CN2018/074495 Written Opinion dated Apr. 19, 2018, 4 pages.
PCT/CN2018/074495 English translation of Written Opinion dated Apr. 19, 2018, 5 pages.
Japanese Patent Application No. 2019-534886 Office Action dated Jun. 16, 2020, 4 pages.
Japanese Patent Application No. 2019-534886 English translation of Office Action dated Jun. 16, 2020, 4 pages.
Chinese Patent Application No. 201710132219.0 Notification of Registration Action dated Feb. 26, 2020, 4 pages.
Chinese Patent Application No. 201710132219.0 English translation of Notification of Registration Action dated Feb. 26, 2020, 5 pages.
Singapore Patent Application No. 11201906191T Search Report and Written Opinion dated Mar. 9, 2020, 8 pages.
Australian Patent Application No. 2018229784 Office Action dated Apr. 9, 2020, 4 pages.

* cited by examiner

US 10,834,245 B2

RECEIVER AND CAMERA ASSEMBLY

CROSS-REFERENCE TO RELATED APPLICATIONS

This application is a Continuation Application of U.S. application Ser. No. 15/867,256, filed Jan. 10, 2018, which claims priority to and benefits of Chinese Patent Application No. 201710132219.0, filed with National Intellectual Property Administration of PRC on Mar. 7, 2017, the entire content of the aforementioned applications is incorporated herein by reference.

FIELD

The present disclosure relates to a field of communication technology, and particularly to a receiver and camera assembly for a mobile terminal.

BACKGROUND

In a conventional mobile terminal (such as a smartphone), a receiver is mounted in the mobile terminal. An aperture is provided in a top of the receiver, and the receiver sends a sound wave outwardly through the aperture, so as to allow the mobile terminal to transmit a sound signal to a user.

On the other hand, a camera is also mounted in the mobile terminal, and the camera has an aperture at a top as well, so as to enable the camera to acquire an external image through the aperture.

However, in this kind of design solution, it is required to provide a plurality of apertures in a screen, so as to realize functions of the receiver and the camera. The plurality of apertures needs to occupy a large area of the screen of the mobile terminal, which causes a low ratio of a display area to the screen.

SUMMARY

An embodiment of the present disclosure provides a receiver and camera assembly configured to be mounted in a mobile terminal, comprising a receiver, a camera, and a sensor assembly, the receiver having a light signal passage, the camera being aligned with the light signal passage, the camera comprising a base and a camera lens, the base having a mounting surface facing the light signal passage, and the camera lens and the sensor assembly being mounted to the mounting surface.

Another embodiment of the present disclosure provides a receiver and camera assembly configured to be mounted in a mobile terminal, comprising a receiver, a camera, and a sensor assembly, the camera comprising a base and a camera lens, the base having a mounting surface, and the camera lens and the sensor assembly being mounted to the mounting surface, the receiver being disposed around the camera.

Yet another embodiment of the present disclosure provides a receiver and camera assembly configured to be mounted in a mobile terminal, comprising a receiver, a camera, and a sensor assembly, the receiver having a light signal passage, the camera and the sensor assembly being aligned with the light signal passage, the camera comprising a base and a camera lens, the base having a mounting surface facing the light signal passage, and the camera lens being mounted to the mounting surface.

BRIEF DESCRIPTION OF THE DRAWINGS

To describe the technical solutions in the embodiments of the present disclosure more clearly, the accompanying drawings required for describing the embodiments are briefly introduced in the following. Apparently, the accompanying drawings in the following description illustrate merely some embodiments of the present disclosure, and those ordinarily skilled in the art can also derive other drawings from these accompanying drawings without creative efforts.

DETAILED DESCRIPTION

Figure 1:
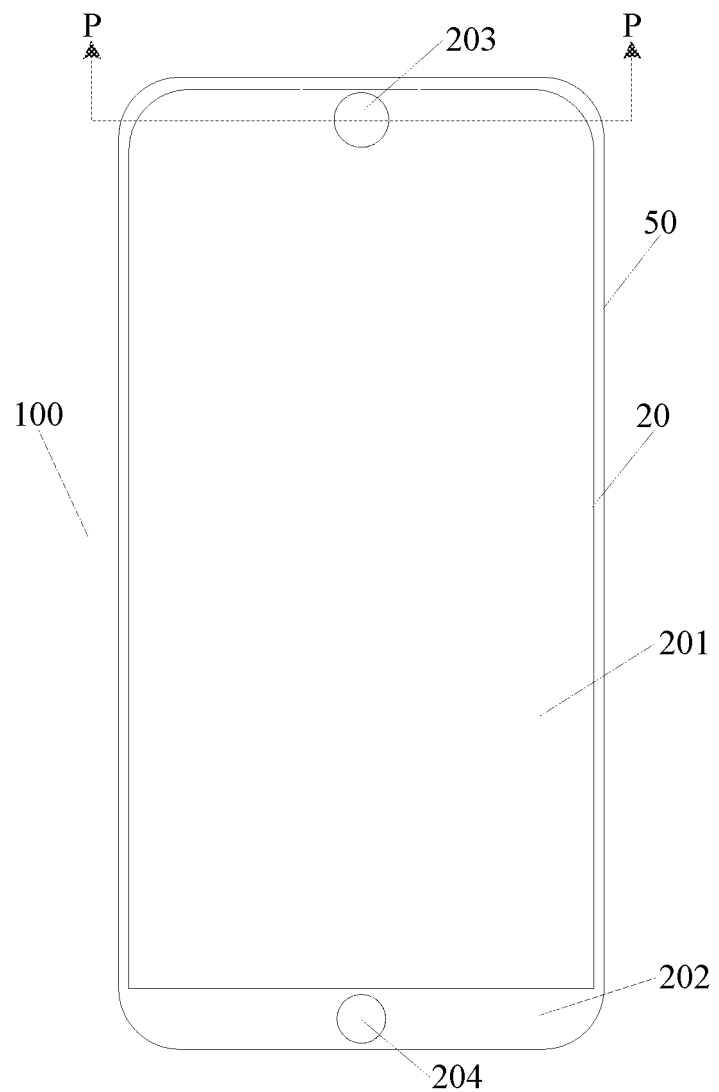
FIG. 1 is a schematic view of a mobile terminal provided in an embodiment of the present disclosure.

The technical solutions of the embodiments of the present disclosure are clearly and completely described below with reference to the accompanying drawings in the embodiments of the present disclosure. Apparently, the described embodiments are only a part instead all of the embodiments of the present disclosure. All of the other embodiments derived by those ordinarily skilled in the art without creative effort based on the embodiments in the present disclosure belong to a protection scope of the present disclosure.

In the specification, it is to be understood that terms such as "central", "longitudinal", "lateral", "length", "width", "thickness", "upper", "lower", "front", "rear", "left", "right", "vertical", "horizontal", "top", "bottom", "inner", "outer", "clockwise" and "counterclockwise", should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, the term "a plurality of" means two or more than two, unless specified otherwise.

In the present disclosure, unless specified or limited otherwise, the terms "mounted", "connected", "joined", "fixed" and the like are used broadly, and may be, for example, fixed connections, detachable connections, or integral connections; may also be mechanical or electrical connections; may also be direct connections or indirect connections via intervening structures; may also be inner communications of two elements. The above terms can be understood by those skilled in the art according to specific situations.

In the description of the present disclosure, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on", "above", or "on top of" a second feature may include an embodiment in which the first feature is right "on", "above" or "on top of" the second feature, and may also include an embodiment in which the first feature is not right "on", "above" or "on top of" the second feature, or just means that the first feature has a sea level elevation larger than the sea level elevation of the second feature. While first feature "beneath", "below" or "on bottom of" a second feature may include an embodiment in which the first feature is right "beneath", "below" or "on bottom of" the second feature, and may also include an embodiment in which the first feature is not right "beneath", "below" or "on bottom of" the second feature, or just means that the first feature has a sea level elevation smaller than the sea level elevation of the second feature.

The following disclosure provides many different embodiments or examples to realize different structures of the present disclosure. To simplify the disclosure of the present disclosure, components and configurations in particular examples are elaborated. Of course, they are illustrative, and are not intended to limit the present disclosure. Moreover, reference numbers and/or letters may be repeated in different examples of the present disclosure for the purpose of simplicity and clarity, which shall not be constructed to indicate the relationships among various embodiments and/or configurations. In addition, the present disclosure provides examples of various specific processes and materials, but applicability of other processes and/or utilization of other materials are conceivable for those skilled in the art.

An embodiment of the present disclosure provides a receiver and camera assembly configured to be mounted in a mobile terminal, comprising a receiver, a camera, and a sensor assembly, the receiver having a light signal passage, the camera being aligned with the light signal passage, the camera comprising a base and a camera lens, the base having a mounting surface facing the light signal passage, and the camera lens and the sensor assembly being mounted to the mounting surface.

Another embodiment of the present disclosure provides a receiver and camera assembly configured to be mounted in a mobile terminal, comprising a receiver, a camera, and a sensor assembly, the camera comprising a base and a camera lens, the base having a mounting surface, and the camera lens and the sensor assembly being mounted to the mounting surface, the receiver being disposed around the camera.

Yet another embodiment of the present disclosure provides a receiver and camera assembly configured to be mounted in a mobile terminal, comprising a receiver, a camera, and a sensor assembly, the receiver having a light signal passage, the camera and the sensor assembly being aligned with the light signal passage, the camera comprising a base and a camera lens, the base having a mounting surface facing the light signal passage, and the camera lens being mounted to the mounting surface.

Figure 2:
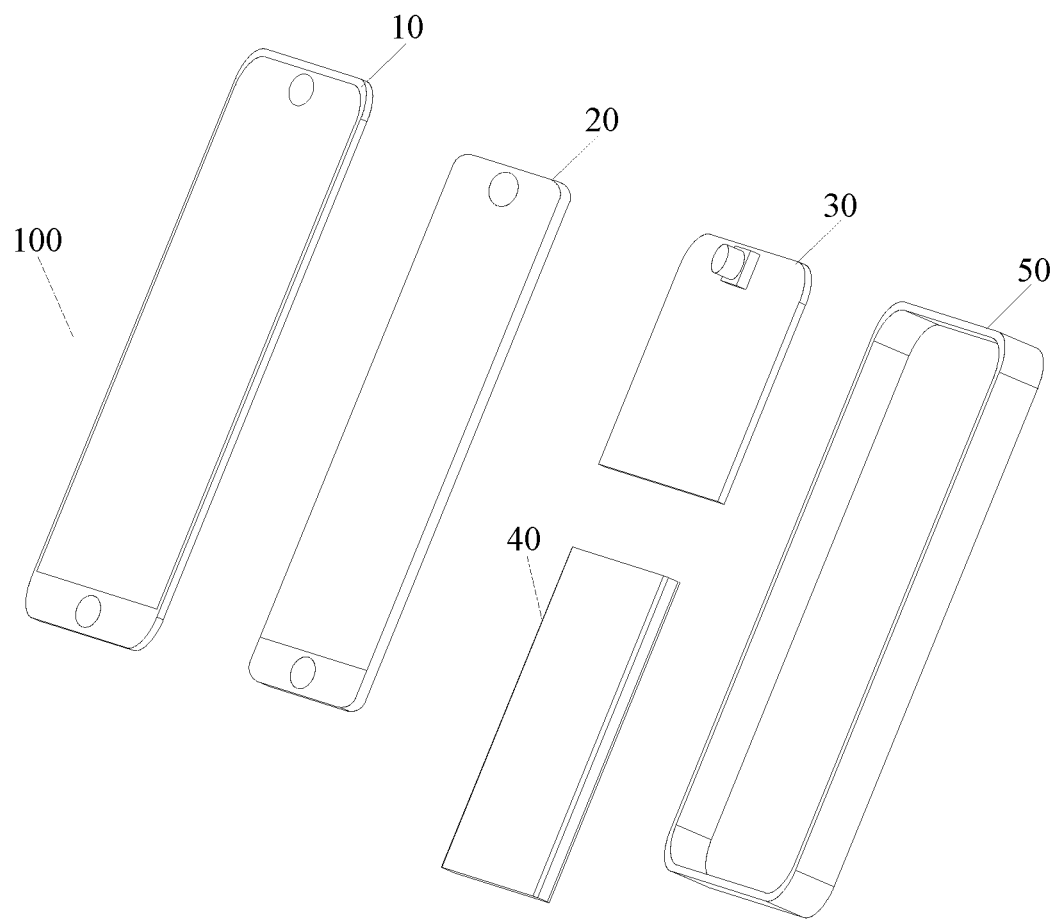
FIG. 2 is an exploded view of a mobile terminal provided in an embodiment of the present disclosure.

Referring to FIGS. 1 and 2, a mobile terminal 100 includes a cover plate 10, a display screen 20, a circuit board 30, a battery 40 and a housing 50.

Figure 3:
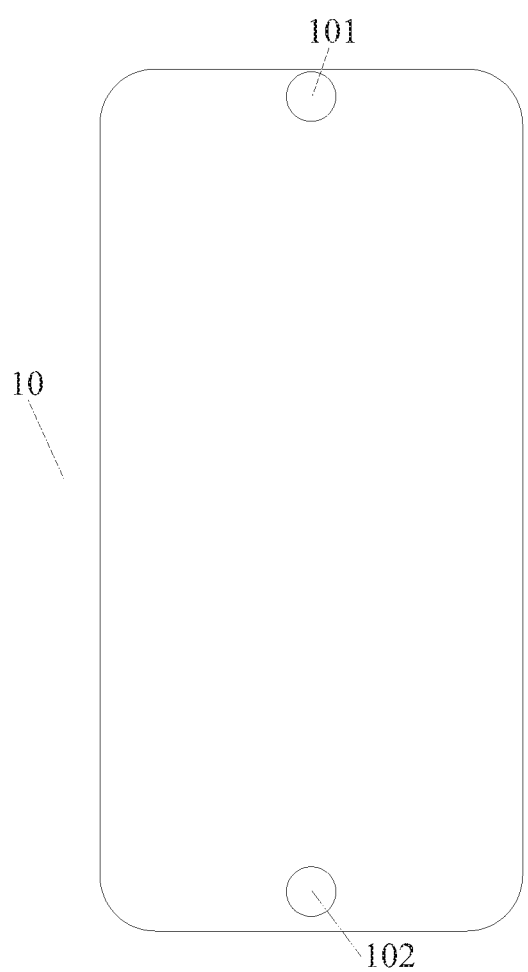
FIG. 3 is a schematic view of a cover plate provided in an embodiment of the present disclosure.

The cover plate 10 is mounted to the display screen 20 so as to cover the display screen 20. Referring to FIG. 3, the cover plate 10 has a first through hole 101 and a second through hole 102. The first through hole 101 and the second through hole 102 are disposed at two ends of the cover plate 10 respectively. The first through hole 101 can be configured to enable a receiver in the mobile terminal 100 to transmit a sound signal outwardly through the first through hole. The second through hole 102 can be configured to enable a fingerprint unit in the mobile terminal 100 to acquire use finger information through the second through hole.

In some embodiments, the first through hole 101 can be disposed at a top middle of the cover plate 10, and the second through hole 102 can be disposed at a bottom middle of the cover plate 10.

The cover plate 10 can be a transparent glass cover plate. In some embodiments, the cover plate 10 can be a glass cover plate made of a material such as sapphire.

Figure 4:
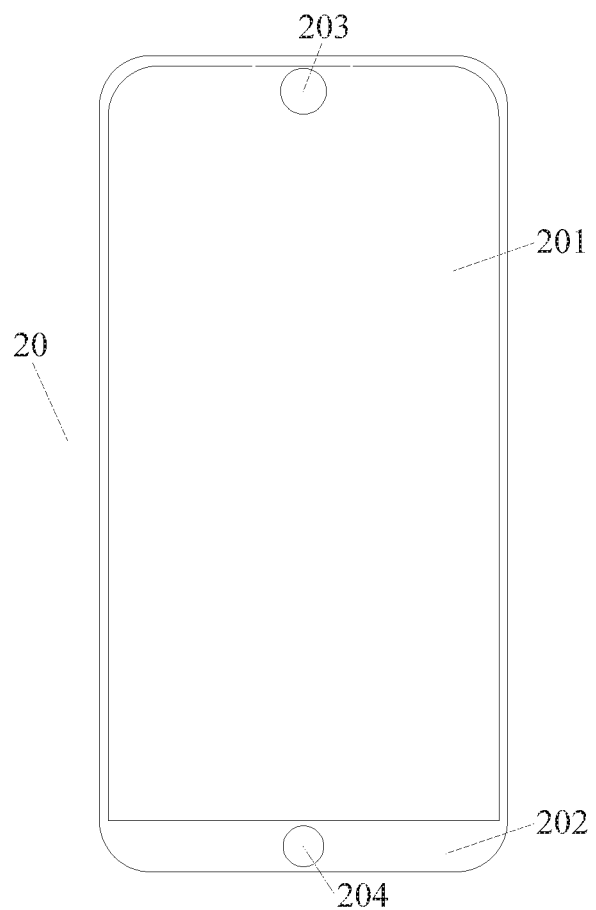
FIG. 4 is a schematic view of a display screen provided in an embodiment of the present disclosure.

The display screen 20 is mounted to the housing 50 so as to form a display surface of the mobile terminal 100. Referring to FIG. 4, the display screen 20 includes a display area 201 and a non-display area 202. The display area 201 is configured to display information like image and text. The non-display area 202 does not display information. The non-display area 202 can be provided with a functional assembly such as the fingerprint unit and a touch circuit.

The display area 201 is provided with a third through hole 203. The third through hole 203 is aligned with the first through hole 101 in the cover plate 10. The third through hole 203 can be configured so that the camera in the mobile terminal 100 can acquire an external image signal through the third through hole, a proximity sensor in the mobile terminal 100 can emit and receive a signal through the third through hole, and the receiver in the mobile terminal 100 can transmit the sound signal outwardly through the third through hole.

The non-display area 202 is provided with a fourth through hole 204. The fourth through hole 204 is aligned with the second through hole 102 in the cover plate 10. The fourth through hole 204 can be configured so that the fingerprint unit in the mobile terminal 100 can acquire the user fingerprint information through the fourth through hole.

In some embodiments, the third through hole 203 can be disposed at a top middle of the display area 201, and the fourth through hole 204 can be disposed at a bottom middle of the non-display area 202.

The circuit board 30 is mounted in the housing 50. The circuit board 30 can be a main board of the mobile terminal 100 and functional assemblies such as the camera, the proximity sensor, and the receiver can be integrated in the circuit board 30. Meanwhile, the display screen 20 can be electrically connected to the circuit board 30.

Figure 5:
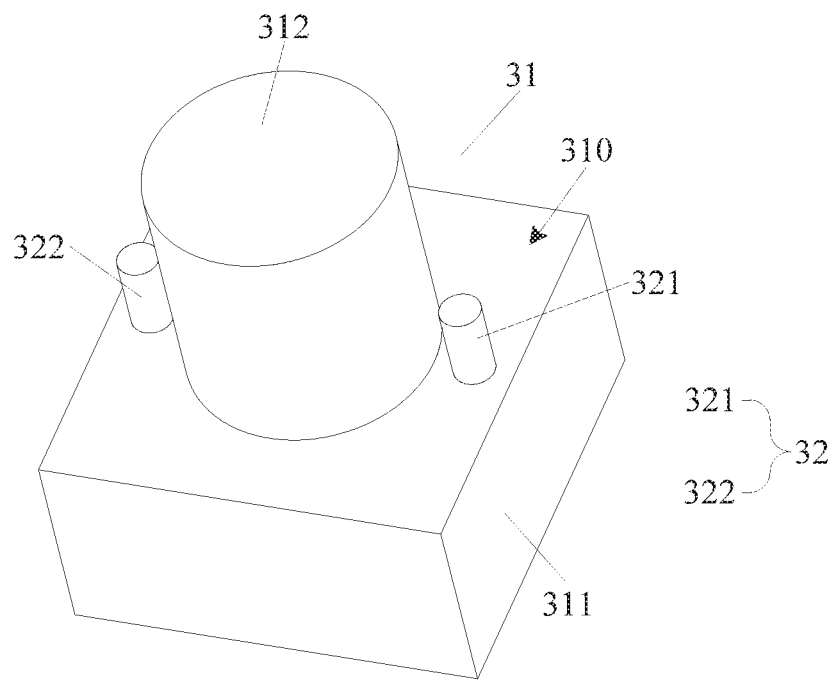
FIG. 5 is a first schematic view of a camera provided in an embodiment of the present disclosure.

Referring to FIG. 5, the camera 31 can be integrated in the circuit board 30. The camera 31 includes a base 311 and a camera lens 312. The camera lens 312 is mounted to the base 311. A contour of the base 311 can be rectangular, circular or in other shapes. A contour size of the base 311 is larger than a contour size of the camera lens 312, so that a step 310 can be formed at a mounting face of the camera lens 312 and the base 311. A step surface of the step 310 faces the display screen 20 in the mobile terminal 100.

The sensor assembly 32 is mounted to the step 310. The sensor assembly 32 includes a signal emitter 321 and a signal receiver 322. The signal emitter 321 and the signal receiver 322 can compose the proximity sensor. The signal emitter 321 and the signal receiver 322 are electrically connected to the circuit board 30.

The signal emitter 321 is configured to emit a signal, and the signal receiver 322 is configured to receive a reflected signal formed by reflecting the emitted signal by an external object. The mobile terminal 100 can judge a distance state between the mobile terminal 100 and the external object according to strength of the reflected signal so as to control a display state of the display screen 20.

The above-mentioned signal can be a light signal such as an infrared ray, a laser and the like, and can also be other types of signals.

The signal emitter 321 and the signal receiver 322 can be disposed at different sides of the camera lens 312 along a width direction of the mobile terminal 100. The signal emitter 321 and the signal receiver 322 can also be disposed at different sides of the camera lens 312 along a length direction of the mobile terminal 100.

As the camera 31 is formed with the step 310 and hence the sensor assembly 32 can be mounted on the step 310, it is unnecessary to provide an independent aperture for the sensor assembly 32 in the mobile terminal 100. Thus, occupation of the sensor assembly 32 on the display area in the screen of the mobile terminal 100 is reduced, that is, a ratio of the display area to the screen is increased.

Figure 6:
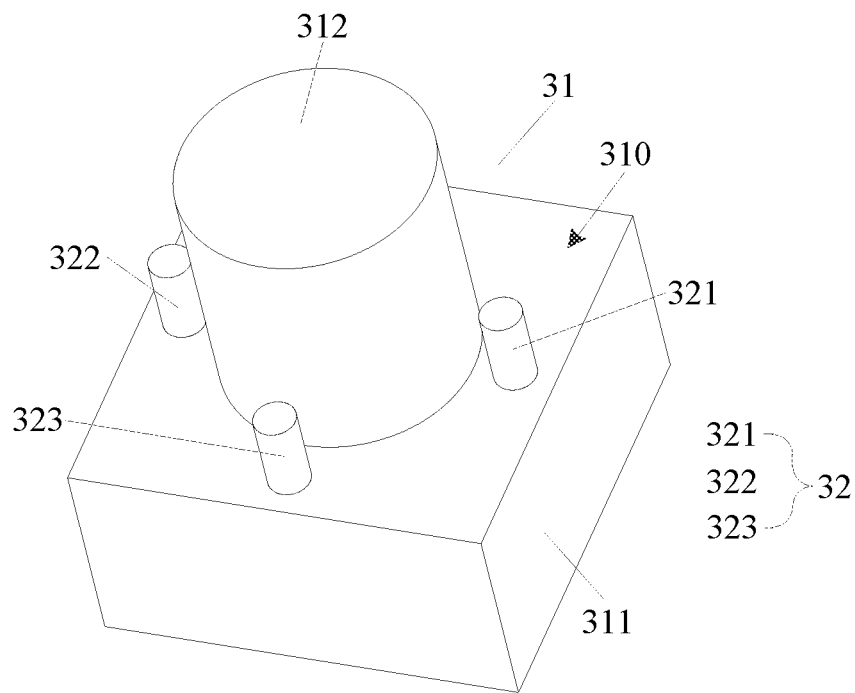
FIG. 6 is a second schematic view of a camera provided in an embodiment of the present disclosure.

Referring to FIG. 6, the sensor assembly 32 further includes an ambient light sensor 323. The ambient light sensor 323 is disposed around the camera lens 312 and mounted on the step 310. The ambient light sensor 323 is also electrically connected to the circuit board 30. The ambient light sensor 323 is configured to receive an ambient light signal. The mobile terminal 100 can also adjust brightness of the display screen 20 according to strength of the ambient light signal.

Figure 7:
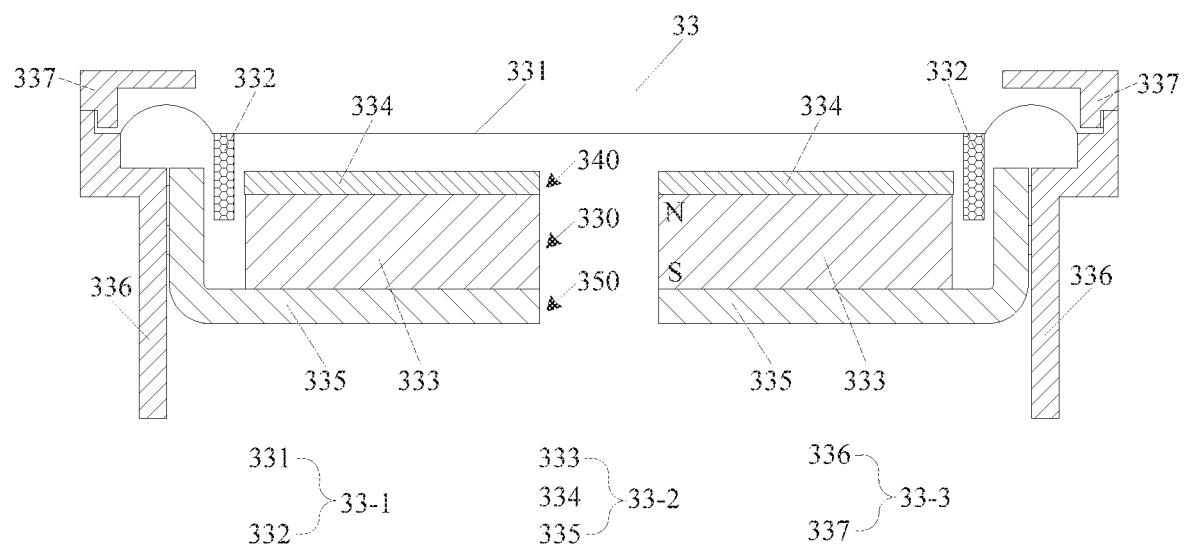
FIG. 7 is a sectional view of a receiver provided in an embodiment of the present disclosure.

Referring to FIG. 7, the receiver 33 can be integrated in the circuit board 30. The receiver 33 can be comprised of a vibration section 33-1, a magnetic circuit section 33-2 and a supporting section 33-3. The supporting section 33-3 is formed as a casing of the receiver 33. The magnetic circuit section 33-2 is mounted in the casing so as to form a magnetic circuit. The vibration section 33-1 is mounted above the magnetic circuit section 33-2 and produces sound through vibration.

The vibration section 33-1 includes a diaphragm 331 and a voice coil 332. The voice coil 332 is disposed at a side of the diaphragm 331 and connected with the diaphragm 331. The connection between the voice coil 332 and the diaphragm 331 can be realized by a plurality of methods. For example, the voice coil 332 can be connected with the diaphragm 331 in an adhesive method.

The diaphragm 331 can be a transparent diaphragm so as to allow a light signal to pass through. A shape of the diaphragm 331 matches a shape of the receiver 33. The shape of the diaphragm 331 can be circular.

The diaphragm 331 can be an elastic diaphragm and can vibrate up and down along a thickness direction of the diaphragm. When the diaphragm 331 vibrates, air at two sides of the diaphragm vibrates therewith so as to produce sound.

The voice coil 332 is formed by winding a conductive wire upon an insulation frame, the wire having an insulating outer layer. The conductive wire on the voice coil 332 is configured to be connected to an audio-frequency circuit inside the mobile terminal 100.

The magnetic circuit section 33-2 includes a permanent magnet 333, a magnetically conductive sheet 334 and a magnetically conductive plate 335. The magnetically conductive sheet 334 can be disposed at a side (N pole) of the permanent magnet 333, and the magnetically conductive plate 335 is disposed at the other side (S pole) of the permanent magnet 333. The magnetically conductive sheet 334 and the magnetically conductive plate 335 are configured to conduct a magnetic induction line emitted by the permanent magnet 333 so as to form a closed magnetic circuit. The magnetic induction line emitted by the N pole of the permanent magnet 333 passes through the magnetically conductive sheet 334, then passes through the magnetically conductive plate 335, and finally enters the S pole of the permanent magnet 333, so as to form a closed loop circuit. The magnetically conductive sheet 334 can be an iron sheet, and the magnetically conductive plate 335 can be a thin iron plate. The shapes of the magnetically conductive sheet 334 and the magnetically conductive plate 335 can be square, rectangular, or circular. The magnetically conductive sheet 334, the permanent magnet 333, and the magnetically conductive plate 335 can be fastened in the adhesive manner.

The permanent magnet 333 has an aperture 330, the magnetically conductive sheet 334 is provided with an aperture 340, and the magnetically conductive plate 335 has an aperture 350. The aperture 340 and the aperture 350 are both aligned with the aperture 330.

The transparent diaphragm 331, the aperture 340, the aperture 330 and the aperture 350 together form a light signal passage so as to allow the light signal to pass through.

In some embodiments, the permanent magnet 333 is a nanometer permanent magnet. That is, permanent magnetic material particles are uniformly coated with a layer of soft magnetic material by nanotechnology, or the permanent magnetic material and the soft magnetic material are combined together by a chemical process such as a replacement reaction, so as to obtain permanent magnetic nanoparticles. Then, the nanometer permanent magnet is manufactured by techniques such as high-pressure molding or high-temperature sintering. The nanometer permanent magnet has higher magnetic induction intensity inside relative to an ordinary Nd—Fe—B permanent magnet. Thus, with the same volume of the permanent magnet, the receiver adopting the nanometer permanent magnet has a higher sound pressure level.

In some embodiments, the magnetically conductive plate 335 is U-shaped. The permanent magnet 333 and the magnetically conductive sheet 334 are disposed at a bottom of the U shape of the magnetically conductive plate 335. Extension portions at two sides of the magnetically conductive plate 335 extend upwards to two sides of the permanent magnet 333 and the magnetically conductive sheet 334. A gap is formed between each of the side extension portions of the magnetically conductive plate 335 and the corresponding side of two sides of the permanent magnet 333 and the magnetically conductive sheet 334, and the voice coil 332 is disposed in the gap.

The supporting section 33-3 includes a support 336 and a protection cover 337. The support 336 is formed in an annular shape. A peripheral protrusion is provided at a periphery of an end of the support 336. The protection cover 337 is formed in an annular shape. An aperture can be provided in a center of the protection cover 337, so that the sound produced by the diaphragm 331 can be transmitted outwardly. A section of the protection cover 337 exhibits a reversed L shape. A periphery of the protection cover 337 is provided with a peripheral recess. With the peripheral protrusion of the support 336 fitted with the peripheral recess of the protection cover 337, the protection cover 337 is mounted to the support 336. The diaphragm 331 is mounted to the support 336 by means of a mounting portion at an edge of the diaphragm. The mounting portion at the edge of the diaphragm 331 can be mounted to the support 336 in the adhesive method.

In some embodiments, the support 336 is made of nanomaterial. The protection cover 337 can also be made of nanomaterial. Both of the support 336 and the protection cover 337 can be integrally formed by the nanomaterial through injection molding. The support 336 and the protection cover 337 made of nanomaterial have higher strength, which can improve mechanical reliability of the receiver 33.

Figure 8:
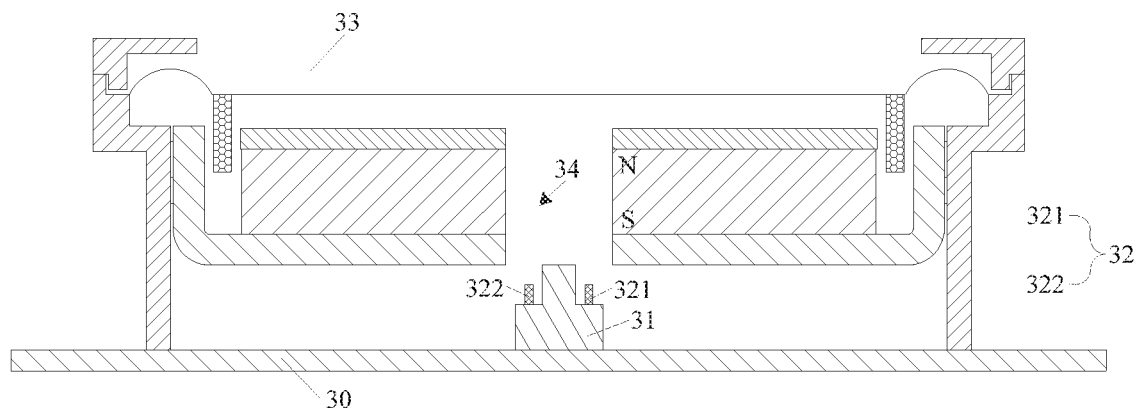
FIG. 8 is a schematic view where a receiver, a camera and a sensor assembly are mounted to a circuit board in an embodiment of the present disclosure.

Referring to FIG. 8, in the mobile terminal 100, the camera 31 and the receiver 33 are both mounted to the circuit board 30. The camera 31 is aligned with the light signal passage 34 of the receiver 33. The sensor assembly 32 can be mounted on the step of the camera 31. Meanwhile, a sensor assembly 32 is electrically connected to the circuit board 30. The sensor assembly 32 includes the signal emitter 321 and the signal receiver 322. The signal emitter 321 and the signal receiver 322 can be disposed at two sides of the camera lens of the camera 31 respectively.

Reference is still made to FIGS. 1 and 2.

The battery 40 is mounted inside the housing 50 and configured to provide electrical energy for the mobile terminal 100.

The housing 50 is configured to form an external contour of the mobile terminal 100. The housing 50 can be made of plastic or metal. The housing 50 can be formed integrally.

Figure 9:
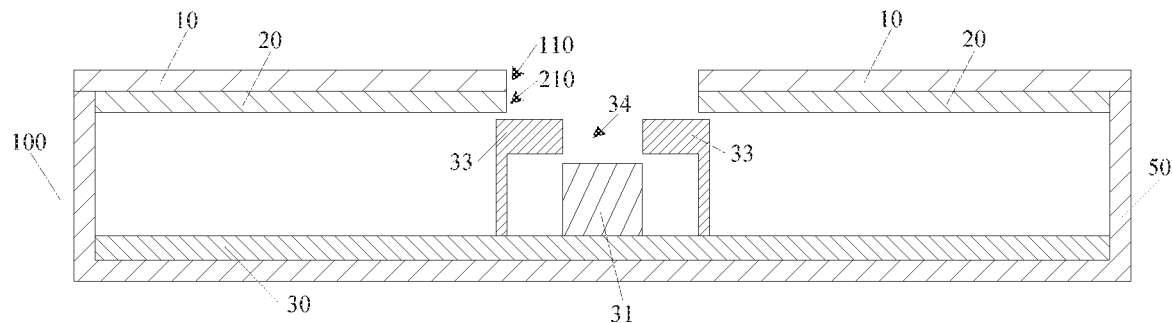
FIG. 9 is a first sectional view of the mobile terminal in FIG. 1 taken along P-P direction.

Referring to FIG. 9, FIG. 9 is a section view of the mobile terminal illustrated in FIG. 1 taken along P-P direction. The cover plate 10 is mounted to the housing 50. The cover plate 10 has an aperture 110. The display screen 20 is also mouthed to the housing 50. The display screen 20 has an aperture 210 (namely the above-mentioned third through hole 203, there is no strict difference between terms "aperture" and "through hole" in the descriptions). The cover plate 10 covers the display screen 20. The aperture 210 is aligned with the aperture 110. The circuit board 30 is mounted in the housing 50.

The camera 31 and the receiver 33 are mounted to the circuit board 30. The receiver 33 is disposed between the camera 31 and the display screen 20. The receiver 33 is aligned with the aperture 210 and the aperture 110 so that the receiver 33 can transmit the sound signal outwardly through the aperture 210 and the aperture 110. The receiver 33 has the light signal passage 34. The camera 31 is aligned with the light signal passage 34 so that the camera 31 can acquire the light signal from the outside through the light signal passage 34, the aperture 210 and the aperture 110.

As the camera 31 is disposed below the receiver 33 along the thickness direction of the mobile terminal 100, it is unnecessary to provide independent apertures for the camera 31 and the receiver 33 in the display screen 20. Thus, occupation of the apertures in the display screen 20 relative to the display area is reduced, and the ratio of the display area to the screen of the mobile terminal 100 is increased.

Figure 10:
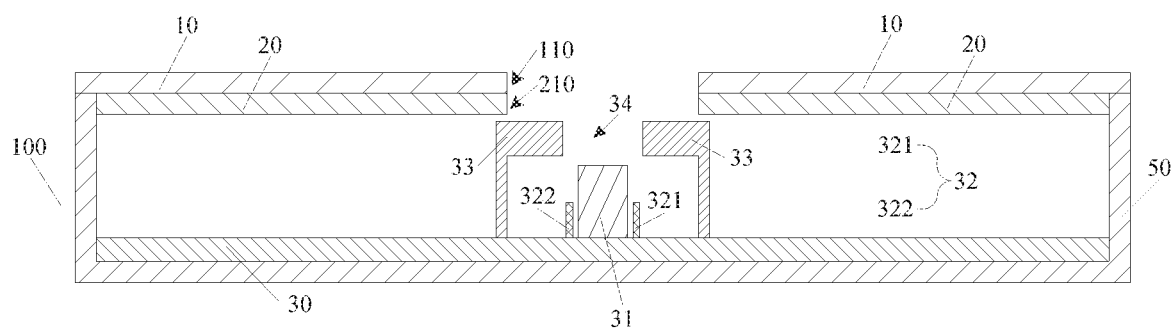
FIG. 10 is a second sectional view of the mobile terminal in FIG. 1 taken along P-P direction.

In some embodiments, as illustrated in FIG. 10, the sensor assembly 32 can be mounted to the circuit board 30. The sensor assembly 32 is aligned with the light signal passage 34 in the receiver 33 so as to allow the sensor assembly 32 to receive and/or emit signals through the light signal passage 34, the aperture 210 and the aperture 110. The sensor assembly 32 includes the signal emitter 321 and the signal receiver 322. The signal emitter 321 and the signal receiver 322 can be disposed at two sides of the camera 31 respectively.

In some embodiments, the sensor assembly 32 can further include the ambient light sensor. The ambient light sensor can be disposed around the camera 31.

Figure 11:
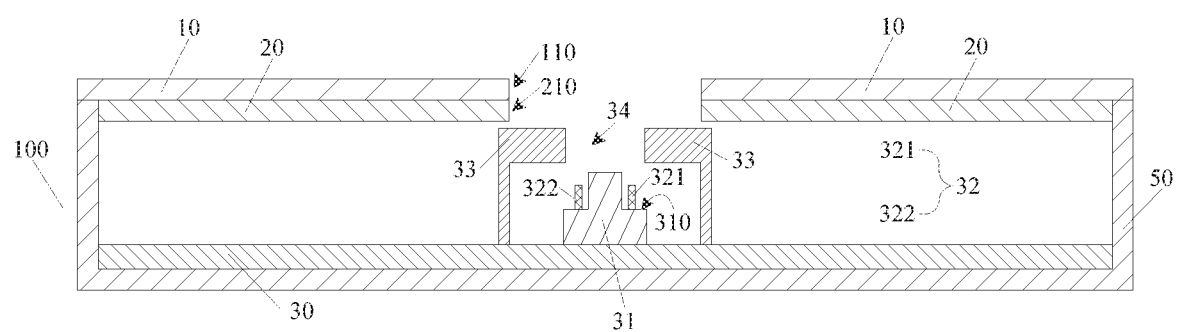
FIG. 11 is a third sectional view of the mobile terminal in FIG. 1 taken along P-P direction.

In some embodiments, as illustrated in FIG. 11, the camera 31 is formed with the step 310. The step surface of the step 310 faces the display screen 20, and the sensor assembly 32 can be disposed on the step 310. The sensor assembly 32 includes the signal emitter 321 and the signal receiver 322. The signal emitter 321 and the signal receiver 322 can be disposed at two sides of the camera lens of the camera 31 respectively.

In some embodiments, the sensor assembly 32 can further include the ambient light sensor. The ambient light sensor can be disposed on the step 310 and around the camera lens of the camera 31.

Figure 12:
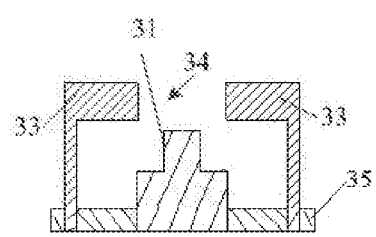
FIG. 12 is a schematic view of a receiver and camera assembly provided in an embodiment of the present disclosure.

As illustrated in FIG. 12, a receiver and camera assembly configured to be mounted in a mobile terminal is provided in embodiments of the present disclosure, including a receiver 33, a camera 31. The receiver 33 has a light signal passage 34, and the camera 31 is aligned with the light signal passage 34. The receiver 33 and the camera 31 can be integrated. Specifically, the receiver 33 and the camera 31 can be mounted to a mounting plate 35. The mounting plate 35 can be configured to be connected to a circuit board of the mobile terminal.

The mobile terminal provided by the embodiment of the present disclosure is described in detail above, and specific examples are used herein to describe the principle and embodiments of the present disclosure. The description of the foregoing embodiments is merely intended to help understand the present disclosure. Meanwhile, those skilled in the art can make modifications to the specific embodiments and application scope according to the idea of the present disclosure. To sum up, the contents of the description should not be construed as limiting the present disclosure.

What is claimed is:

1. A receiver and camera assembly configured to be mounted in a mobile terminal, comprising a receiver, a camera, and a sensor assembly, the receiver being configured to transmit a sound signal and having a light signal passage, the camera being aligned with the light signal passage, the camera comprising a base and a camera lens, the base having a mounting surface facing the light signal passage, and the camera lens and the sensor assembly being mounted to the mounting surface.

2. The receiver and camera assembly according to claim 1, wherein the sensor assembly comprises a signal emitter and a signal receiver, and the signal emitter and the signal receiver are disposed at two sides of the camera lens correspondingly.

3. The receiver and camera assembly according to claim 1, wherein the sensor assembly comprises an ambient light sensor, and the ambient light sensor is disposed around the camera lens.

4. The receiver and camera assembly according to claim 1, wherein the receiver comprises a permanent magnet, a magnetically conductive sheet and a magnetically conductive plate, the permanent magnet has a first aperture, the magnetically conductive sheet has a second aperture, the magnetically conductive plate has a third aperture, and the first aperture, the second aperture, and the third aperture are aligned with the light signal passage separately.

5. The receiver and camera assembly according to claim 4, wherein the magnetically conductive plate is U-shaped, and the permanent magnet and the magnetically conductive sheet are disposed at bottom of the magnetically conductive plate.

6. The receiver and camera assembly according to claim 5, wherein extension portions at two sides of the magnetically conductive plate extend upwards to two sides of the permanent magnet and the magnetically conductive sheet.

7. The receiver and camera assembly according to claim 6, wherein a gap is formed between each of the extension portions at two sides of the magnetically conductive plate and a corresponding side of the two sides of the permanent magnet and the magnetically conductive sheet, and a voice coil is disposed in the gap.

\* \* \* \* \*